Aug. 28, 1928.
F. E. MODLIN
1,682,681
NUTCRACKER
Filed June 26, 1926
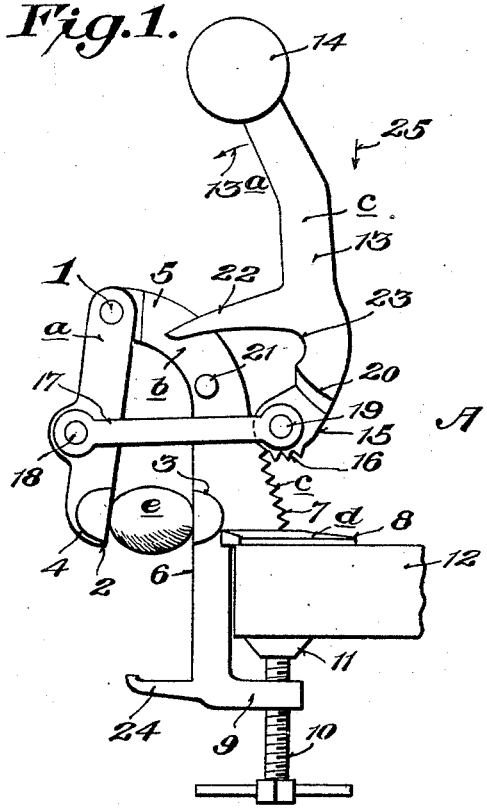
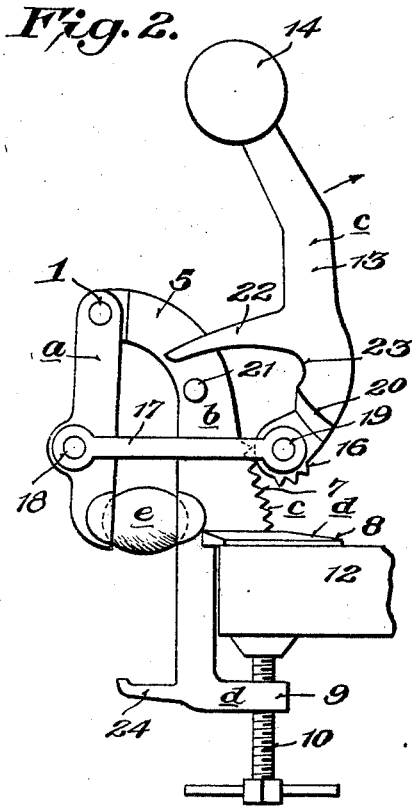
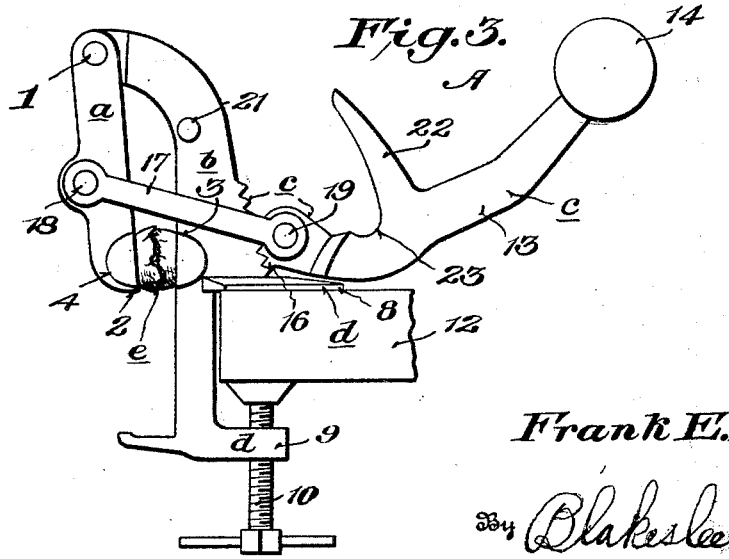
Inventor
Frank E. Modlin,
By Blakeslee & Brown
Attorney Patented Aug. 28, 1928.

1,682,681

UNITED STATES PATENT OFFICE.

FRANK E. MODLIN, OF GLENDALE, CALIFORNIA.

NUTCRACKER.

Application filed June 26, 1926. Serial No. 118,788.

This invention relates to gripping and crushing means, and in particular to a nut cracker. One serious defect in nut crackers that the inventor is familiar with, lies in the fact that said nut crackers in addition to breaking the hard shell of the nut, crush the meat as well.

The present invention has for an object the provision of a nut cracker wherein the meat of the nut is not harmed in the least, resultant upon breakage of the hard shell.

A further object is the provision of a nut cracker which adjusts itself in accordance with the size of the nut to be cracked. Another important object is the provision of a nut cracker which will allow nuts to be cracked with great speed.

Other objects, include simplicity in use, inexpensiveness of construction, attractiveness in appearance, and a device that is generally superior.

With the above and other objects in view, the invention consists in the novel and useful provision, formation, construction, association and relative arrangement of parts, members and features, all as shown in certain embodiments in the accompanying drawing, described generally and more particularly pointed out in claims.

In the drawing:

Figure 1 is a side elevation of the improved nut cracker showing a nut in position to be broken;

Figure 2 shows the jaw portions of the cracker shown in Figure 1 about to engage the nut; and, Figure 3 shows the position of the nut cracker attendant upon the breaking of the nut.

Corresponding parts in all the figures are designated by the same reference characters.

Referring with particularity to the drawing, the improved device is designated as an entirety in one embodiment by A, of which $a$ and $b$ are jaw members, $c$ jaw-actuating means, and $d$ a clamp associated with one of the jaws whereby the device as an entirety may be secured to some supporting member.

The jaws $a$ and $b$ are hingedly connected at 1 and said jaw $a$ is provided with a nut-engaging head 2, and the jaw $b$ is likewise provided with a cooperating nut-engaging head 3 in substantial alignment with the jaw head 2. In the present instance the jaw heads are similarly formed, comprising in the case of the jaw $a$ an enlarged portion which is formed with a concave recess 4. The jaw $b$ is curved adjacent one end, as shown at 5 to the zone where it is hingedly connected to the jaw $a$, and the front wall 6 of said jaw is substantially straight-sided, while the rear wall thereof is formed with a rack portion 7 constituting a part of the jaw-actuating means $c$. This rack 7 is inclined relative to the front wall 6 and terminates adjacent a flattened piece 8 transversely extending from the opposite sides of the said jaw to form one of the clamp members $d$. The opposite extremity of the jaw $b$ is bent at an angle as shown at 9 to form a second portion of the clamp $d$, and a screw-threaded shaft 10 is screw-threaded to the part 9, which screw-threaded shaft carries a clamp head 11 whereby an object such as 12 which may constitute a table top may be clamped as between said head 11 and the part 8. The second part of the means $c$ constitutes an arm 13 carrying at one end a handle 14 and the opposite end is formed with a curved head 15, a portion of which is provided with teeth 16. A pair of parallel links 17 are on opposite sides of the said jaws $a$ and $b$ and the head 15, with said links pivoted to the jaw $a$ at 18 and to the head at 19. The handle 13 is off-set at 20 so that the handle may be swung in the direction of the arrow 13$^a$ on Figure 1 and rest upon the stud 21 projecting from the jaw $b$. To this end the said handle is provided with a projection 22 and when the handle has been moved in the direction of the arrow 13$^a$ in Figure 1 the stud will rest within the curved portion 23 thereof. The jaw $b$ is likewise provided with a hook 24 projecting from the wall 6.

The operation of the device is as follows:

Assume a walnut to be cracked as shown in Fig. 1 at $e$,—the walnut is inserted between the jaw heads 3 and 4 of the jaws $a$ and $b$, and the operator pushes downwardly upon the handle 14 in the direction of the arrow 25 which will cause a portion of the rounded head 15 to slide over the rack teeth substantially as illustrated in Figure 2, until such time as the nut is gripped between said jaw heads, whereupon rotating the handle in the direction of the arrow of Fig. 2 the teeth 16 on the head will engage the rack teeth and cause a further closing of the jaws to crush the walnut as shown in Figure 3. Inasmuch as the rack is inclined downwardly, movement of the head 15 thereon will tend to close the jaws $a$ and $b$, it being remembered that there is a link connection between the handle 13 and the jaw $a$. A bucket or other receiving container may be secured to the hook 24 and an operator need only place the nuts between the jaw heads and move the handle to crush the nut, then release the jaws from their closed position and insert another nut, allowing the crushed nut to drop into the container.

It will be immediately apparent that nuts of different sizes are readily accommodated by this device, due to the inclined rack member which immediately allows for adjustment of the jaws in accordance with nut size.

It is obvious that various changes and modifications may be made in practicing the invention, in departure from the particular showing of the drawing, without departing from the true spirit of the invention.

Having thus disclosed my invention, I claim and desire to secure by Letters Patent:

1. In a device of the character disclosed, a pair of jaws hinged together, a handle member, a link between one of said jaws and said handle, the other of said jaws being formed with an inclined wall, said handle being adapted to wedge against said inclined wall to move the link and in turn cause relative movement of the jaws.

2. In a device of the character disclosed, a pair of jaws hinged together, a pair of parallel links straddling said jaws, and pivoted to one of the jaws, a handle pivoted between said links and for cooperation with the other of said jaws to cause relative movement there-between.

3. In a device of the character disclosed, a pair of jaws hingedly connected, a pair of parallel links, one of said jaws being pivoted between said links and a handle joined to the links and adapted for cooperation with the other of said jaws, said other jaw being formed with an inclined wall portion for cooperation with the handle to cause relative movement between the said jaws when the handle is moved.

4. In a device of the character disclosed, a pair of jaws, an inclined rack on one of said jaws, a link pivotally connected at one end to one of said jaws, a handle pivotally connected to the other end of said link, a head on said handle formed with a portion for sliding over said rack when the handle is moved straight downward, for drawing said other jaw toward said first jaw for gripping an object between said jaws, and teeth on said head for engaging said rack when the handle is swung downwardly on its pivot, for positively drawing said other jaw toward said first jaw for crushing the gripped object between said jaws.

In testimony whereof, I have signed my name to this specification.

FRANK E. MODLIN.